United States Patent
Vilhuber et al.

(10) Patent No.: US 9,692,741 B1
(45) Date of Patent: Jun. 27, 2017

(54) REMOTE SIGNING WRAPPED APPLICATIONS

(71) Applicant: Symantec Corporation, Mountain View, CA (US)

(72) Inventors: Jan Vilhuber, Frenchtown, MT (US); James Sanders, South San Francisco, CA (US); Beau Ufen, Sunnyvale, CA (US); Todd Wakerley, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 21 days.

(21) Appl. No.: 14/560,988

(22) Filed: Dec. 4, 2014

(51) Int. Cl.
*H04L 29/06* (2006.01)

(52) U.S. Cl.
CPC .................... *H04L 63/08* (2013.01)

(58) Field of Classification Search
CPC .......... G06F 21/54; G06F 21/50; G06F 21/12; G06F 21/00; H04L 63/10; H04L 63/08; H04L 63/061; H04L 63/0823
USPC ............................................................ 726/3
See application file for complete search history.

(56) References Cited

U.S. PATENT DOCUMENTS

| | | | | |
|---|---|---|---|---|
| 2006/0195689 | A1* | 8/2006 | Blecken | G06F 21/445 713/156 |
| 2013/0091543 | A1* | 4/2013 | Wade | G06F 21/54 726/1 |
| 2013/0205415 | A1* | 8/2013 | McKee | G06F 8/24 726/30 |

OTHER PUBLICATIONS

About Digitally Signing RemoteApp Programs, 2010. Retrieved from the Internet: http://technet.microsoft.com/en-us/library/cc754499.aspx.
Securing Your Private Keys as Best Practice for Code Signing Certificates, by Larry Seltzer, [disclosed on or about Mar. 21, 2016]. Retrieved from the Internet: https://www.thawte.com/code-signing/whitepaper/best-practices-for-code-signing-certificates.pdf.
Shell is Only the Beginning, by Carlos Perez, 2013. Retrieved from the Internet: http://darkoperator.com/blog/2013/3/5/powershell-basics-execution-policy-part-1.html.
Code Signing for Installer and Restorer Applet, [disclosed on or about Mar. 21, 2016]. Retrieved from the Internet: http://www.ahsay.com/jsp/en/home/index.jsp?pageContentKey=ahsay_services_express-installation-services_code-signing.
City of Houston Building Code Chapter 46 Houston Sign Code, 2008. Retrieved from the Internet: http://edocs.publicworks.houstontx.gov/documents/divisions/planning/enforcement/signcode.pdf.
Using password protected code signing certificate with Visual Studio Online, [disclosed on or about Mar. 21, 2016]. Retrieved from the Internet: http://social.msdn.microsoft.com/Forums/sqlserver/en-US/df36ae47-41b6-4941-9c9f-7358aa7ba268/using-password-protected-code-signing-certificate-with-visual-studio-onfine?forum=TFService.

* cited by examiner

*Primary Examiner* — Yogesh Paliwal
(74) *Attorney, Agent, or Firm* — Holland & Hart LLP

(57) ABSTRACT

A method for signing a wrapped computer application is described. In some embodiments, methods may include receiving a wrapped computer application via a first secure communication connection from a first remote server, authenticating the first secure communication connection, modifying the wrapped computer application based at least in part on the authenticating, and transmitting the wrapped computer application via a second secure communication connection to a second remote server based at least in part on the modifying.

16 Claims, 9 Drawing Sheets

REMOTE SIGNING WRAPPED APPLICATIONS

BACKGROUND

Advancements in media delivery systems and data-related technologies require additional security for electronic applications—including mobile applications. This additional security may be designed to protect the mode of communication between entities or devices, or the electronic applications themselves. Often an entity is required to or desires to sign and certify an electronic application. But current methods for certification and signing require the exchange of otherwise private, confidential, and sensitive information by requiring an entity to transmit their private information—such as a key—to another entity. In some cases this exchange may lead to inadvertent or insidious disclosure of this private information. Or, in other cases, some third party entities may have terms, service, and/or other restrictions that limit what information a signing entity can share with others.

Because of current systems' limitations, a need exists for an entity to certify and/or sign electronic applications and then transmit these certified and/or signed applications to other entities that perform additional functions, such as wrapping the electronic application, with having to pursue costly, time-intensive alternatives. In some cases, a need exists for a signing entity to be able to sign an application, another entity to wrap the application, and the signing entity to sign the then-wrapped application. Accordingly, the present systems and methods address these and other related problems, particularly those related to signing and/or certifying wrapped applications.

SUMMARY

According to at least one embodiment, a method for signing a wrapped computer application is described. In some embodiments, the method may include receiving a wrapped computer application via a first secure communication connection from a first remote server, authenticating the first secure communication connection, modifying the wrapped computer application based at least in part on the authenticating, and/or transmitting the wrapped computer application via a second secure communication connection to a second remote server based at least in part on the modifying.

In some embodiments, modifying the wrapped computer application may include modifying a certificate. In some embodiments, the certificate may include confidential information known only by an entity modifying the wrapped computer application.

In some embodiments, authenticating the first secure communication connection may include authenticating based at least in part by using one or more keys. In some embodiments, the one or more keys may include at least one of a public key and a private key.

In some embodiments, the first secure communication connection and the second secure communication connection are the same. In some embodiments, the method may include transmitting an unwrapped computer application having an identification key via a third secure communication connection.

In some embodiments, modifying the wrapped computer application may include modifying a certificate using a signature key. In some embodiments, the identification key is the same as the signature key. In some embodiments, the first remote server and the second remote server may be the same.

In some embodiments, the wrapped computer application may be received based at least in part on one or more requests sent to the first remote server. In some embodiments, the wrapped computer application may be received based at least in part on one or more notifications sent by the first remote server.

In some embodiments, the method may include authenticating the second secure communication connection. In some embodiments, transmitting the wrapped computer application may be based at least in part on the authenticating the second secure communication connection.

According to a least one embodiment, a computing device for signing a wrapped computer application is described. In some embodiments, the computing device may include a processor and memory in electronic communication with the processor. In some embodiments, the memory stores computer executable instructions that when executed by the processor cause the processor to perform one or more steps. In some embodiments, these steps may include receiving a wrapped computer application via a first secure communication connection from a first remote server, authenticating the first secure communication connection, modifying the wrapped computer application based at least in part on the authenticating, and/or transmitting the wrapped computer application via a second secure communication connection to a second remote server based at least in part on the modifying.

In some embodiments, modifying the wrapped computer application may include modifying a certificate. In some embodiments, the instructions executed by the processor may cause the processor to perform the step of transmitting an unwrapped computer application having an identification key via a third secure communication connection.

In some embodiments, the wrapped computer application is received based at least in part on one or more requests sent to the first remote server. In some embodiments, the instructions executed by the processor may cause the processor to perform the step of authenticating the second secure communication connection, where the transmitting may be based at least in part on the authenticating the second secure communication connection.

In some embodiments, modifying the wrapped computer application may include using a signature key. In some embodiments, the certificate may include confidential information known only by an entity modifying the wrapped computer application.

According to at least one embodiment, a non-transitory computer-readable storage medium storing computer executable instructions that when executed by a processor cause the processor to perform certain steps. In some embodiments, the steps may include receiving a wrapped computer application via a first secure communication connection from a first remote server, authenticating the first secure communication connection, modifying the wrapped computer application based at least in part on the authenticating, and/or transmitting the wrapped computer application via a second secure communication connection to a second remote server based at least in part on the modifying.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments. These drawings are explicitly incorporated in this disclosure and are a part of the specification. Together with the following description, these drawings demonstrate and explain various principles of this disclosure.

Figure 1:
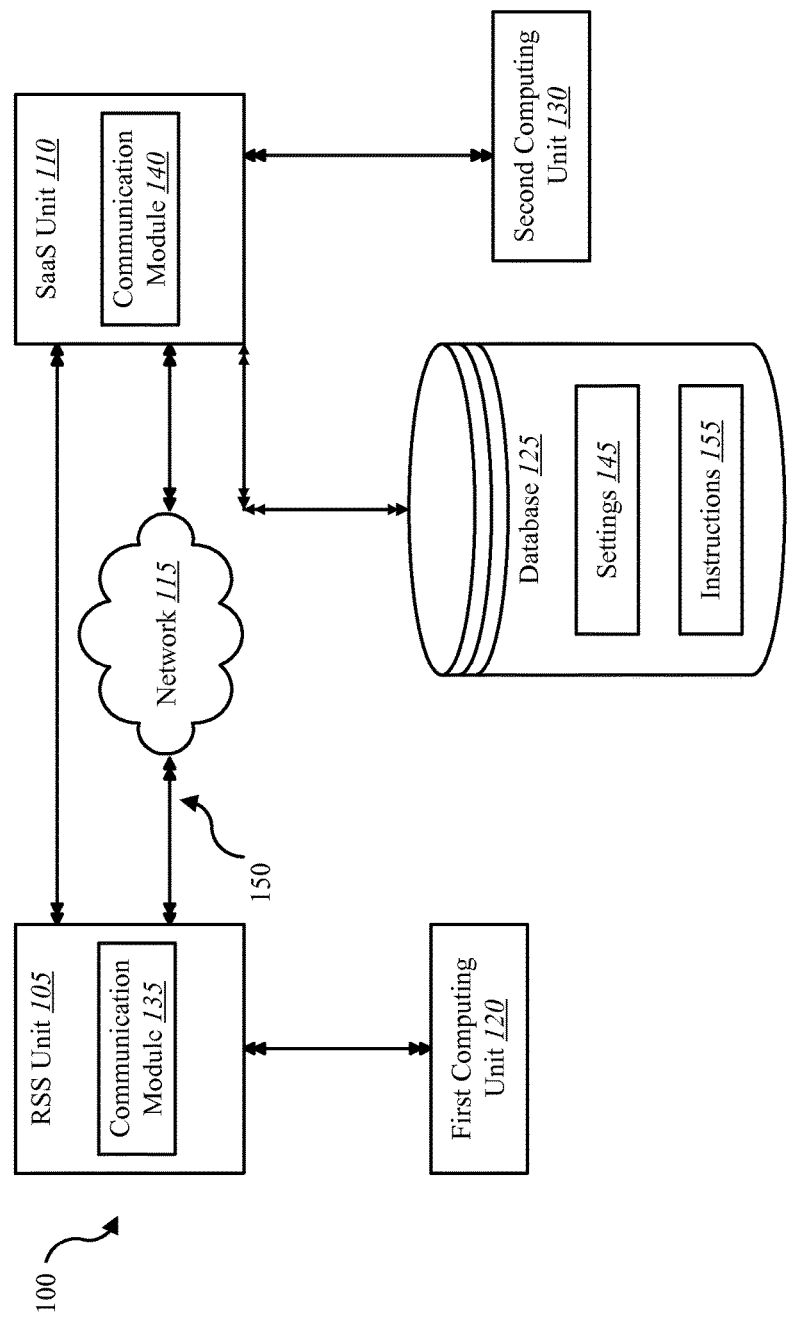
FIG. 1 is a block diagram illustrating embodiments in which the present systems and methods may be implemented.

While the embodiments described here are susceptible to various modifications and alternative forms, specific embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives falling within the scope of the claims.

DETAILED DESCRIPTION

The systems and methods described here relate to application wrapping techniques, and/or signing and/or certifying applications. In some embodiments, the systems and methods described here relate to signed applications, application wrapping techniques, and/or re-signing and/or re-certifying then-wrapped applications.

In some embodiments, wrapping an application may include changing an application—including a mobile application—by inserting, revising, altering, and/or amending code in that application. In some embodiments, wrapping may include inserting one or more policies. Sometimes a first entity develops an application but a second entity may wrap the application—each performing discrete functions and playing to each entity's strengths.

For example, in some embodiments, the first entity may understand and develop applications, such as mobile applications, but may not understand the nuances and the requirements of security, have the capability to perform and/or modify cryptographic or other security-related features, may use a second entity's software as a service (SaaS) platform for efficiency, and/or other reasons. Applications may be signed to verify the signing entity (avoiding malicious applications), using a remote signing service (RSS). Sometime already-signed applications may need to be modified by wrapping or another means, and then the previously signed applications must be re-signed by the same (or a different) entity.

The re-signing or the re-certifying (or if the application is unsigned/uncertified, the signing or the certifying) is most often performed by the first entity that developed the application, by using one or more signature keys—such as a cryptographic key. In some embodiments, this first entity signs the application using confidential information, sends the application to a second entity to wrap the application, and/or the second entity sends the wrapped application to the first entity to re-sign and/or re-certify. In some embodiments, the first entity sends an application that has not been signed before it is wrapped by the second entity. The present systems and methods include aiding the signing/re-signing and/or the certifying/re-certifying of already-wrapped applications.

The present methods and systems provide ways for entities to be able to work together while protecting the certification and/or the signing information. For example, by allowing a first entity to re-sign and/or re-certify an already wrapped application the first entity can still use the second entity's SaaS platform with ease. In some embodiments, the re-signing of wrapped applications that were previously uploaded in a SaaS environment may be performed through a signing service hosted on premises at a customer's site (e.g., via a RSS unit).

In some embodiments, this RSS is performed via a RSS software application that may run via and/or on one or more computers, a RSS server, a RSS protected personal computer, and/or some other computing device.

In some embodiments, the RSS device and the SaaS device may connect and/or communication through a "pull" function (e.g., a request, etc.), a "push" function (e.g., a notification, etc.), and/or some other method. In some embodiments, the RSS device may fetch the required information. In some embodiments, the devices may connect and/or communicate automatically—through an automated method—based at least in part on a "pull" function, a "push" function, and/or some other method. The terms device and entity are related in this disclosure unless otherwise noted and relate to an entity (e.g., a company, an individual, etc.) that controls a device (e.g., a computer, a server, etc.).

In some embodiments, the communication link between the RSS device and the SaaS device may be a secure communication link. This secure communication link may require authentication, encryption, and/or both. The communications between the RSS device and the SaaS device may include multiple secure communications between them and/or other devices. These secure communications—transmitted and/or received via secure communication links—may be performed using one communication link to perform all the required functions or multiple communication links.

In some embodiments, the RSS and the SaaS may both use authentication. In some embodiments, the authentication may use one or more public-private authentication key pairs. Where multiple authentication key pairs are created and/or used at least some of the authentication key pairs may pertain to the RSS device (or entity) and/or at least some of the authentication key pairs may pertain to the SaaS device (or entity). In some embodiments, the device and/or the entity-specific authentication key pairs are known only to one entity, and not others. For example, a first authentication key pair specific to the RSS device may not be known to the SaaS device. As another example a private part of the first key pair specific to the RSS device and/or entity may not be known to the SaaS device and/or entity, but a public part of the first key pair specific to the RSS device and/or entity may be known to the SaaS device and/or entity.

In some embodiments, a public part of the RSS device's authentication key pair would be communicated to the SaaS device, while the private part of the RSS device's authentication key pair would not be communicated to the SaaS device. In some embodiments, a public part of the SaaS device's authentication key pair would be communicated to the RSS device, while the private part of the SaaS device's authentication key pair would not be communicated to the RSS device.

In some embodiments, a dual authentication may occur, which may include authenticating the RSS device and authenticating the SaaS device. In some embodiments, authentication may require multiple pieces of information to be verified. For example, the RSS device may authenticate a communications link by verifying a person or an entity associated with the SaaS device, a tenant associated with the SaaS device, and/or verifying a server or a device (which may or may not be related to the SaaS device—such as a server). In some embodiments, this authentication may include using a username and/or a password. In some embodiments, this authentication may include using a secret and/or an API key. In some embodiments, this authentication may include using an authentication key pair—which may include generating a key pair specifically related to each entity and/or device. In some embodiments, this authentication may include a client certified authenticated secure sockets layer (SSL) connection.

In some embodiments, every communication between devices related to an application may be authenticated. In some embodiments, communications relating to signed applications and/or other communications may be authenticated. In some embodiments, communications relating to wrapped applications and/or other communications may be authenticated. In some embodiments, communications relating to re-signed applications and/or other communications may be authenticated.

In some embodiments, the SaaS device may receive an application that may or may not have been signed and/or certified before the SaaS device received it. In some embodiments, after an application is wrapped (and/or re-wrapped), the wrapping entity (e.g., a SaaS entity, etc.) may provide one or more certificates for another entity (e.g., a RSS entity, etc.) to sign and/or resign. In some embodiments, the wrapping entity may sign the certificate before providing the certificate to the other entity. In some embodiments, the wrapping entity may sign the certificate using one or methods (e.g., including using a key having at least one of a public key and a private key, etc.).

In some embodiments, a wrapped computer application includes applications designed for network computers, servers, personal computers, mobile device applications, tablet computers, smartphones, computing units, and/or other devices that use computing technology In some embodiments, the RSS device and/or entity pulls an application—such as a wrapped application—from the SaaS device and/or entity. The RSS device and/or entity may then sign and/or certify the application. The RSS device and/or entity may then push the then-certified (and in some cases wrapped) application to a SaaS device and/or entity.

In some embodiments, the SaaS device and/or entity pushes an application—such as a wrapped application—from the SaaS device and/or entity. The RSS device and/or entity may then sign and/or certify the application. The RSS device and/or entity may then push the then-certified (and in some cases wrapped) application to a SaaS device and/or entity.

In some embodiments, the pushing and/or the pulling of an application may be based on an elapsed time (e.g., every 3, 5, or 10 seconds), a notification (e.g., the RSS device would receive a notification that a wrapped application is ready), a request (e.g., the RSS device would make a request to another device about the availability of a wrapped application), and/or some other related method. In some embodiments, one or more of the devices and/or entities may store and/or receive a notification about the length of the elapsed time intervals. For example, if the RSS device initiates a pull every 5 seconds, then both the RSS and the SaaS devices may know and/or store this interval.

In some embodiments, at least one of the devices and/or entities may adjust the elapsed time interval—including requests for pulling and/or pushing—based at least in part on one or more performance parameters, including past performance. For example, if a RSS device is unsuccessful in pulling an application after X number of pull requests and/or over an interval of length Y, the RSS device (as an example) may adjust the elapsed time interval based at least in part on the X number of pull requests and/or the length Y, among other parameters—increase system performance and decreasing system requirements.

In some embodiments, the secure communications between the two devices and/or entities may be performed based on a single secure connection, which may be uninterrupted. In some embodiments, the single secure connection may include authenticating the connection at least one time. In some embodiments, the single secure connection may include authenticating the connection more than one time and authenticating the connection may occur based on one or more parameters. These parameters may include, among other things, time, system performance and/or characteristics, device performance and/or characteristics, connection performance and/or characteristics, etc.

In other embodiments, the secure communications between the two devices and/or entities may be performed based on multiple secure connections—including multiple secure connections running in series and/or in parallel. In some embodiments, at least some of the multiple secure connections may require authentication. In other embodiments, every secure connection may require authentication.

In some embodiments, after a device and/or an entity (e.g., the RSS unit) signs and/or certifies (or re-signs and/or re-certifies) an application, another device and/or entity (e.g., the SaaS unit) may use information to verify the device and/or entity that signed and/or certified the application. This information may include, among other things, information relating to a signature key pair. For example, the SaaS device may use a previously used and/or a new key public key as part of a signature key pair to verify the device and/or entity that signed and/or certified the application. In some embodiments, the SaaS device may obtain the previously used and/or the new key public key from the RSS device.

In some embodiments, a RSS unit may have an authenticated persistent duplex connection and/or polling connection to a SaaS unit. A customer may communicate an application package to be distributed to a SaaS device for wrapping. After wrapping, the application package may be communicated to a RSS device—which may in some embodiments be located on premises at a customer site. In some embodiments, the RSS device may then sign and/or certify (or re-sign and/or re-certify) the application package using confidential information, such as a private signature key. After signing is complete, the now-signed (or now-resigned) application package may be communicated to a SaaS unit through the authenticated persistent connection.

In some embodiments, a RSS unit may include a RSS server. In some embodiments, a SaaS unit may include a SaaS server. In some embodiments, a RSS unit may include an on premises server and/or computing unit (located at a customer site and/or a related site) with knowledge of a customer's private key, among other things. The RSS unit may or may not be associated with a particular customer account. In some embodiments, a SaaS unit may include a unit hosting an application delivery platform for computing devices (e.g., mobile devices), among other things.

In some embodiments, in addition to or instead of authentication, other security measures may be carried out. In some embodiments, an administrator may authenticate and/or sign-in to a designated SaaS device and/or tenant. In some embodiments, an administrator may upload an application package (that may or may not include an Android application package (APK) and/or an IPA) to their SaaS device and/or tenant. In some embodiments, a module on the SaaS device and/or tenant may sign the application package with a SaaS-issued signing certificate unique to the tenant (where this SaaS-issued signing certificate may be created and/or provisioned during customer on-boarding). In some embodiments, the signed application package may be delivered to the on-premise service that may then validate the signature of the application package to ensure that it originated from the proper SaaS servers and/or tenants. In some embodiments, the on-premise service may re-sign the application package with a signature key. In some embodiments, the on-premise service may deliver a final signed application package back to the SaaS device and/or tenant for distribution to enrolled end-users (e.g., mobile end-users) and/or perform other actions.

FIG. 1 illustrates an example of a communications system 100 in accordance with various aspects of this disclosure. System 100 may include a RSS unit 105, a SaaS unit 110, a network 115, a first computing unit 120, a database 125, a second computing unit 130, connections 150, and/or other components.

In some embodiments, RSS unit 105 may include a communication module 135 and SaaS unit 110 may include a communication module 140. Communication modules 135 and 140 may include the same and/or different capabilities and/or may perform the same and/or different functions. The features described may relate to similar components, such as communication modules 135 and 140, may apply to other similar components and/or elements, and/or different components and/or elements. Or, in some cases, features described relating to similar components (communication modules 135 and 140) and/or elements may not apply to with respect to other similar components and/or elements.

In some embodiments, RSS unit 105 may include communication module 135. This communication module 135 may facilitate communication between RSS unit 105 and other components of system 100, including but not limited to SaaS unit 110, network 115, first computing unit 120, database 125, second computing unit 130, and/or others. In some embodiments, communication module 135 may facilitate communication between RSS unit 105 and elements of other system elements, such as communication module 140, settings 145, and/or instructions 155, among others.

In some embodiments, communication module 135 may facilitate communication via one or more connections 150, which may include direct connections (e.g., RSS unit 105 directly connected to second computing unit 130) and/or indirect connections (e.g., RSS unit 105 connected to second computing unit 130 via SaaS unit 110). In some embodiments, communication module 135 may facilitate communication via one or more wired and/or wireless connections.

In some embodiments, RSS unit 105 may communicate through communication module 135 (or not, but instead directly) with SaaS unit 110, first computing unit 120, database 125, second computing unit 130, and/or other components and/or elements, via a communication path that includes a combination and/or one or more designated connections 150 and/or network 115. In some embodiments, all components and/or elements of system 100 may communicate using network 115. In some embodiments, all components and/or elements of system 100 may communicate using one or more connections 150.

In some embodiments, first computing unit 120 may include certain capabilities and/or characteristics and second computing unit 130 may include certain capabilities and/or characteristics. First computing unit 120 and second computing unit 130 may include the same and/or different capabilities and/or may perform the same and/or different functions. The features described relating to first computing unit 120 may apply to second computing unit 130, and vice-versa, or in some cases may not apply to second computing unit 130.

First computing unit 120 may be able to communicate with RSS unit 105. In some embodiments, RSS unit 105 may include a specially programmed computer, a specially programmed server, and/or both. RSS unit 105 may include a designated server and/or computer that may be protected in order to ensure protection of an entity's confidential information.

In some embodiments, this confidential information may include one or more signature certificates and/or signature keys. In some embodiments, this confidential information may include one or more authentication keys. In some embodiments, this confidential information may include a private key, which in many cases may only be known to the key-holding entity (e.g., the RSS entity), and not other entities (e.g., the SaaS entity, other entities).

In some embodiments, the key-holding entity may desire to protect its confidential information. This may include storing this confidential information on a first computing unit 120. In some embodiments, the first computing unit may be a specially programmed computer, a specially programmed server, and/or both—design to protect confidential signing and/or authenticating information. For example, first computing unit 120 may include a personal computer that stores the confidential information and/or a that is managed by an employee that knows the confidential information (e.g., the private key). By storing this information on first computing unit 120 and/or relying on a special connection between the first computing unit 120 and/or RSS unit 105 the confidential information may be protected.

In some embodiments, network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments, the network 115 may include the internet.

In some embodiments, one or more devices illustrated in system 100 may communicate with and/or link to database 125. Database 125 may include stored settings 145 and/or instructions 155. In some embodiments, instructions 155 may include instructions related to information generated, transmitted, received, authenticated, modified, and/or otherwise related to at least one of RSS unit 105, SaaS unit 110, network 115, first computing unit 120, second computing unit 130, and/or other components of system 100 and/or other systems. In some embodiments, information and/or instructions related to and/or based at least in part data packets and/or applications, that may be encrypted and/or require authentication, may be included and/or stored in database 125.

In some embodiments, RSS unit 105, SaaS unit 110, and/or other components may access settings 145 and/or instructions 155 in database 125 over network 115. Settings 145 and/or instructions 155 may include stored content. In some embodiments, database 125 may be internal or external to one or more components of system 100 (i.e., connected to a device through network 115 and/or connected directly to one or more devices of system 100). For example, at least a portion of database 125 may be internal and/or external to other components of system 100, such as RSS unit 105 and/or SaaS unit 110. In some embodiments, settings 145 may include, but are not limited to, user preferences, passwords, keys, personal information, system information (e.g., model numbers, installation dates, etc.), performance characteristics and/or parameters, elapsed times, protocols, other content specifications of other components of system 100 including RSS unit 105, SaaS unit 110, first computing unit 120, second computing unit 130, and/or network 115, and/or information related to the system.

Figure 2:
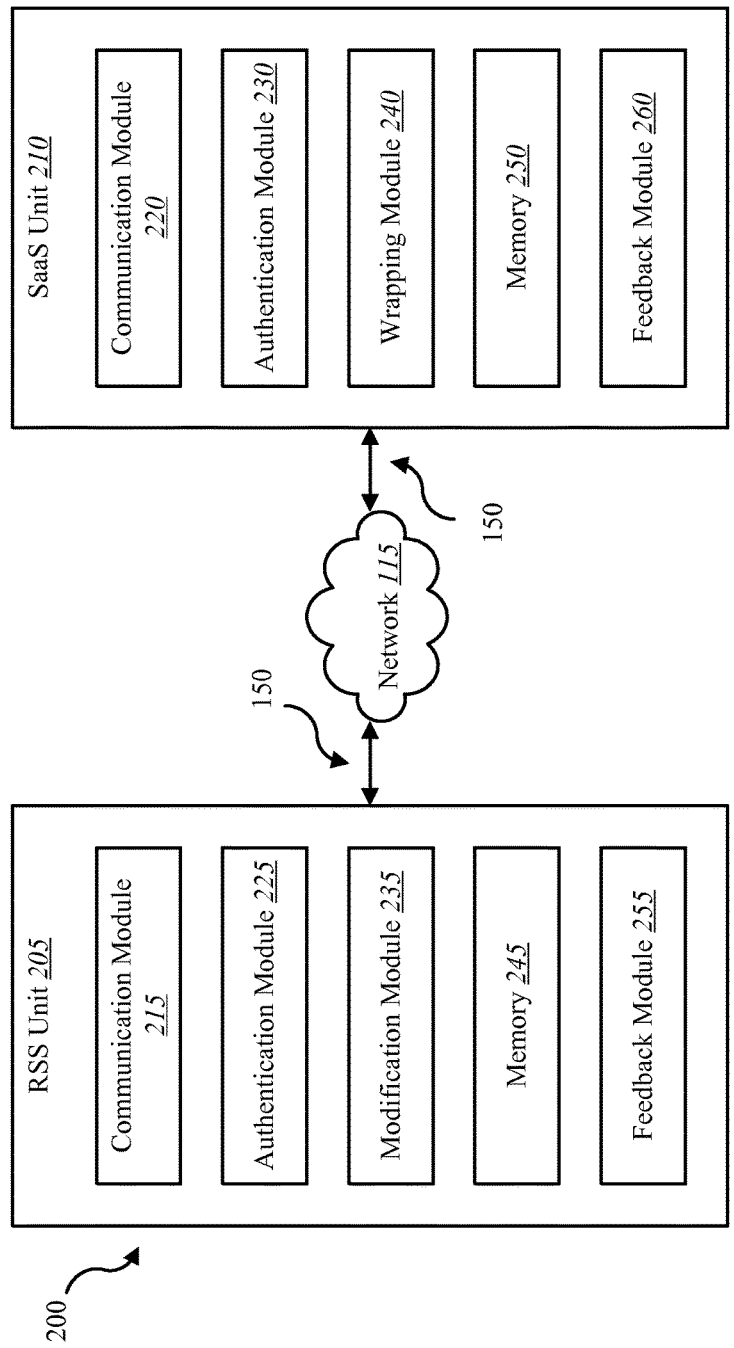
FIG. 2 is a block diagram illustrating embodiments in which the present systems and methods may be implemented.

FIG. 2 illustrates an example of a communications system 200 in accordance with various aspects of this disclosure. System 200 may include RSS unit 205, SaaS unit 210, network 115, connections 150, and/or other components. As stated elsewhere, references to RSS unit 205 relate to and/or incorporate discussion of other specifically-named RSS units (e.g., RSS unit 105) and/or other units that may include similar and/or related characteristics, and/or include similar and/or related functions.

In some embodiments, RSS unit 205 may include communication module 215, authentication module 225, modification module 235, memory 245, feedback module 255, and/or other modules. In some embodiments, SaaS unit 210 may include communication module 220, authentication module 230, wrapping module 240, memory 250, feedback module 260, and/or other modules.

In some embodiments, communication module 215 may facilitate communication between RSS unit 205 and SaaS unit 210. This communication may include unidirectional, bidirectional, and/or combinations of both. In some embodiments, communication module 215 may facilitate communication between RSS unit 205 and SaaS unit 210 via one or more wired and/or wireless connections. In some embodiments, communication module 215 may facilitate communication between RSS unit 205 and SaaS unit 210 via one or more network connections. In some embodiments, communication module 215 may facilitate communication between RSS unit 205 and SaaS unit 210 via one or more secured communication connections.

In some embodiments, communication module 215 may generate a notification and/or a transmission in response to receiving a signal from one or more other components and/or elements, including but not limited to authentication module 225, modification module 235, memory 245, feedback module 255, wrapping module 240, and/or other components and/or elements of systems 200, 100, and/or others. This notification and/or transmission may be sent to one or more components and/or elements of system 200, 100, and/or others.

In some embodiments, RSS unit 205 may include an authentication module 225 that may facilitate authenticating one or more connections, devices, entities, sources, applications, confidential information (e.g., public and/or private keys), certificates, etc. In some embodiments, authentication module 225 helps facilitate secure communication between multiple entities and/or devices. For example, authentication module 225 may facilitate communication between a RSS unit (e.g., RSS unit 205) and a computing unit (e.g., first computing unit 120). As another example, authentication module 225 may facilitate communication between a RSS unit (e.g., RSS unit 205) and a SaaS unit (e.g., SaaS unit 210).

In some embodiments, communication module 215 may facilitate secured communication at least in part based on communication with authentication module 225. Authentication module 225 may independently perform all actions relating to authentication relating to the systems and/or methods described in this disclosure. Or, in some cases, authentication module 225 may perform actions relating to authentication relating to the systems and/or methods described in this disclosure in conjunction with other components and/or elements of other systems.

In some embodiments, authentication module 225 may generate confidential information. In some embodiments, authentication module 225 may generate one or more authentication keys. These one or more authentication keys may include any information related to authentication. In some embodiments, an authentication key may include multiple parts, including a private key and/or a public key.

In some embodiments, authentication module 225 may receive confidential information from another device and/or entity. In some embodiments, authentication module 225 may receiver one or more authentication keys from another device and/or entity.

In some embodiments, the private key and/or the public key may be known only by and/or only possessed by the key-holding entity (other than a separate entity that may have issued the keys). For example, a RSS unit 205 may generate, store and/or receive a private key specific to RSS unit 205 and/or a related entity. This private key may be a uniquely assigned identifier.

In some embodiments, RSS unit 205 may include modification module 235. Modification module 235 may modify an application related to RSS unit 205, SaaS unit 210, and/or other applications. In some embodiments, modification module 235 may modify one or more wrapped applications and/or unwrapped applications. In some embodiments, modifying an application may include modifying, adding, amending, changing, certifying, and/or signing an application, including a certificate, among other things.

A certificate may be a certificate generated and/or added to the application by RSS unit 205 and/or a certificate generated and/or added to the application by the SaaS unit. For example, in wrapping an application SaaS unit 210 may add a certificate to an application and then the wrapped application (now having one or more certificates) may be received and modified by RSS unit 205 via modification module 235. In some embodiments, modifying an application includes signing an application with a signature key, which may only be known by the signing entity.

In some embodiments, an unwrapped application may be transmitted from RSS unit 205 to SaaS unit 210. This unwrapped application may include an identifier, such as an identification key. In some embodiments, the identifier may include information specific to RSS unit 205 and/or the related entity. For example, the identifier may include a unique identification key—such as a signature—assigned to RSS unit 205 and/or entity. This identifier may only be known to RSS unit 205 and/or the related entity. In some embodiments, the identification key may include a signature key.

After RSS unit 205 receives a wrapped application it may modify the wrapped application via modification module 235. In some embodiments, this modification may include using a signature key that may or may not relate to one or more certificates. This signature may be the same as or different from an identifier (e.g., identification key) used with one or more previously transmitted applications—including wrapped and/or unwrapped applications.

In some embodiments, RSS unit 205 may include memory 245. In some embodiments, memory 245 may include computer executable instructions that can be executed by one or more processors. These one or more processors may be present in an element of RSS unit 205 (e.g., communication module 215, authentication module 225, and/or modification module 235) and/or one or more other components of system 200 or other systems (e.g., system 100).

In some embodiments, memory 245 may include computer executable instructions that may cause RSS unit 205 to interact with one or more components of system 200, such as SaaS unit 210. In some embodiments, memory 245 may contain, among other code, the Basic Input-Output system (BIOS) which controls basic hardware operation such as the interaction with peripheral components or devices.

In some embodiments, RSS unit 205 may include feedback module 255. This feedback module may provide feedback related to RSS unit 205 and other components and/or elements of system 200 and/or others. In some embodiments, this feedback may include user-related feedback, device-related feedback, and/or system-related feedback, among others.

In some embodiments, the user-related feedback may communicated to a user via a display or a message service. This user-related feedback may relate to RSS unit 205, network 115, SaaS unit 210, an application, another communication, an authentication, a modification, memory, and/or any other characteristics and/or functions related to a system, such as systems 100 and/or 200.

In some embodiments, the device-related feedback may communicated to a user via a display or a message service. This device-related feedback may relate to RSS unit 205, network 115, SaaS unit 210, an application, another communication, an authentication, a modification, memory, and/or any other characteristics and/or functions related to a system, such as systems 100 and/or 200.

In some embodiments, the system-related feedback may communicated transmitted to a user via a display or a message service. This system-related feedback may relate to RSS unit 205, network 115, SaaS unit 210, an application, another communication, an authentication, a modification, memory, and/or any other characteristics and/or functions related to a system, such as systems 100 and/or 200.

Figure 3:
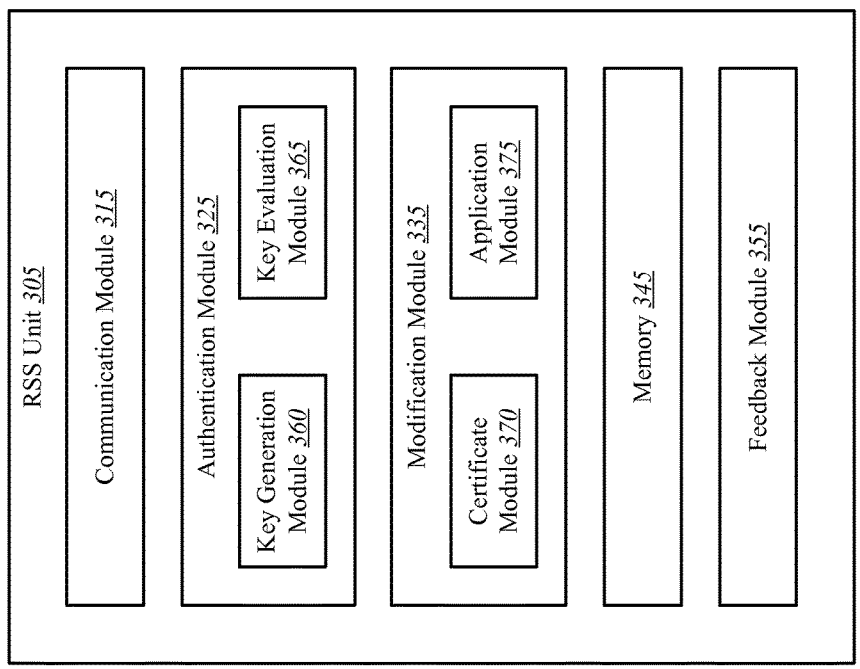
FIG. 3 is a diagram illustrating example of a RSS unit related to the present systems and methods.

FIG. 3 illustrates an example of a communications system 300 in accordance with various aspects of this disclosure. System 300 may include RSS unit 305 and other components and/or elements (i.e., other components and/or elements discussed in this disclosure, such as those related to systems 100 and/or 200, among others). In some embodiments, system 300 may include communication module 315, authentication module 325, modification module 335, memory 345, feedback module 355, and/or other modules. As stated elsewhere, references to RSS unit 305 may relate to and incorporate discussion of other specifically-named RSS units (e.g., RSS units 105 and/or 205) and/or other units that may include similar or related characteristics and/or include similar or related functions (e.g., SaaS units 110 and/or 210, among others).

In some embodiments, authentication module 325 may include key generation module 360 and/or key evaluation module 365, among others. Key generation module 360 may generate information, such as one or more authentication keys, relating to one or more components of a system. For example, key generation module 360 may generate one or more keys for authentication relating to a RSS unit and/or a first computing unit. In other examples, key generation module 360 may generate one or more keys for authentication relating to a SaaS unit and/or a second computing unit. Or key generation module 360 may generate one or more keys for authentication relating to a RSS unit, a first computing unit, a SaaS unit, a second computing unit, and/or other components. In some embodiments, key generation module 360 may generate a key that includes multiple parts such as a public key and a private key, among others.

In some embodiments, key evaluation module may evaluate one or more keys related to a system, including keys relating to authentication and/or communications between one or more RSS units and/or SaaS units. For example, key evaluation module 365 may evaluate one or more keys—including private and/or public keys—relating to a secure communication. This evaluation may include comparing one or more keys to one or more known, stored, and/or related keys and/or values.

Figure 4:
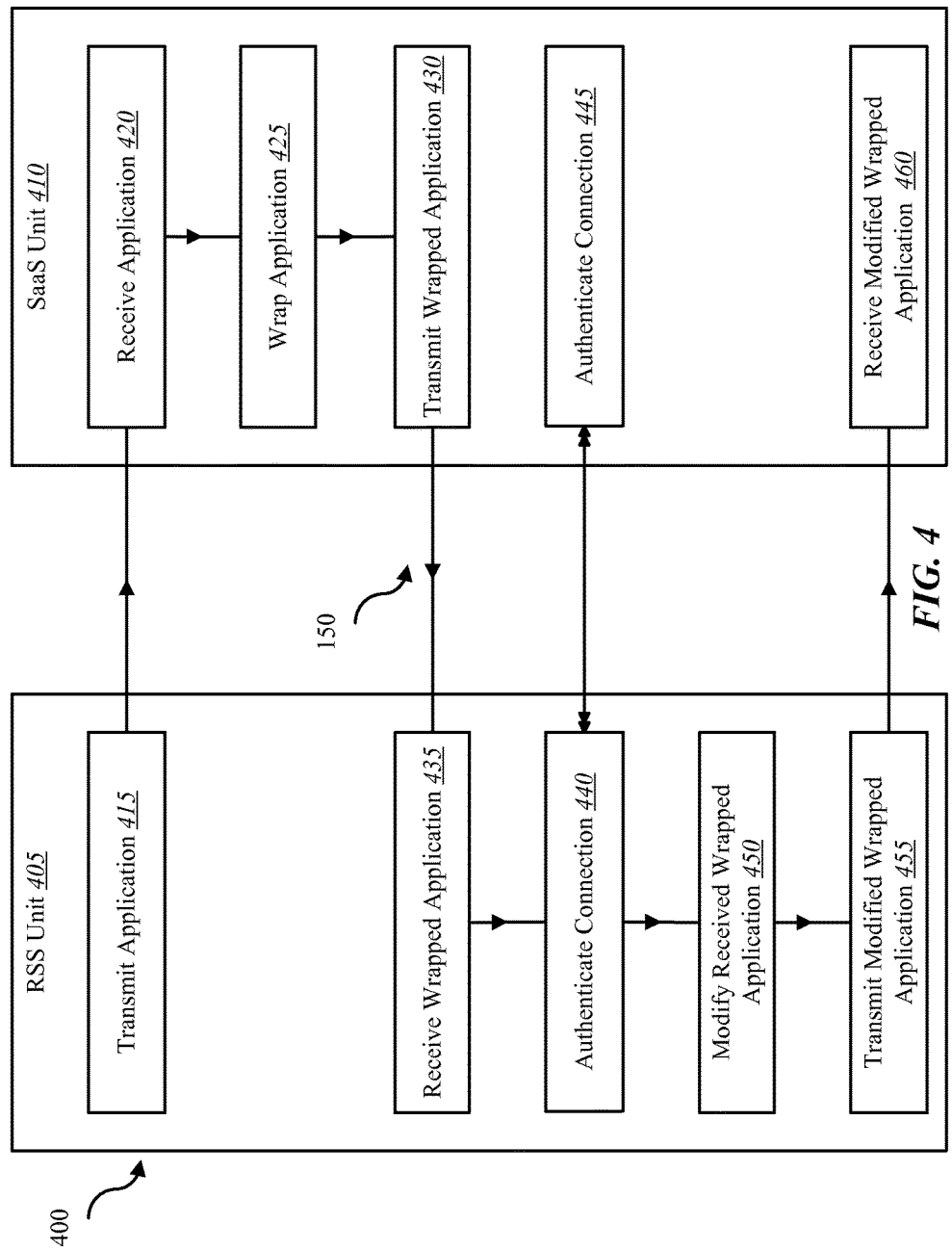
FIG. 4 is a block diagram illustrating embodiments in which the present systems and methods may be implemented.

FIG. 4 is a flow diagram illustrating one embodiment of systems and methods 400 for modifying wrapped applications. In some embodiments, features related to method 400 may be implemented in conjunction with one or more components, elements, and/or modules—such as modification module 235, one or more authentication modules, and/or wrapping module 240, among others.

FIG. 4 shows exemplary methods that may relate to RSS unit 405 and/or SaaS unit 410. But this method and related systems, may be implemented with more and/or less components, elements, steps, actions, and/or modules than shown, referenced, and/or described.

At block 415, RSS unit 405 may transmit one or more applications to SaaS unit 410. In some embodiments, these applications may be wrapped and/or unwrapped. In some embodiments, the applications may or may not be signed by RSS unit 405 and/or a related entity. In some embodiments, the applications may or may not be certified by RSS unit 405 and/or a related entity.

In some embodiments, RSS unit 405 may include one or more pieces of confidential information with at least one of the one or more applications. This confidential information may include a signature key and/or an identifier key—that may only be known by, only possessed by, and/or stored related to RSS unit 405 and/or a related entity—the key holding entity. This information may have at one time been known by a separate entity that may have issued the keys, but is not considered as knowing, possessing, and/or otherwise having the information here. This confidential information may not be known or discoverable by SaaS unit 410, or may only be partially known and/or discoverable by the SaaS unit and/or units—other than and/or in addition to RSS unit 405.

The transmission of the one or more applications may be performed via a communication connection 150, which may be a wired and/or wireless link. This communication connection 150 may or may not include using a network. In addition, the communication connection 150 may be a secure communication link requiring authentication by RSS unit 405, SaaS unit 410, one or more other units related to the transmission, and/or some combination. The authentication may require using one or more authentication keys, which in turn may include one or more public keys and/or one or more private keys, as discussed in this disclosure.

At block 420, a SaaS unit may receive the one or more applications via a communication connection 150. In some embodiments, the received one or more applications may include at least one application having an identifier key and/or a signature key. In some embodiments, the received one or more applications may only include unsigned applications.

At block 425, SaaS unit 410 may then wrap one or more applications received via one or more different receiving events/transmissions. In some embodiments, wrapping may include changing an application—including a mobile application—by inserting, revising, altering, and/or amending code in that application. In some embodiments, wrapping may include inserting, revising, altering, and/or amending one or more policies and/or related pieces of information. In some embodiments, this wrapping may include inserting, revising, altering, and/or amending one or more certificates related to one or more applications.

At block 430, SaaS unit 410 may ready the one or more applications (including wrapped and/or unwrapped applications) to be transmitted. In some embodiments, SaaS unit 410 may then transmits the one or more applications via a communication connection 150. This communication link—like those discussed elsewhere—may require authentication from one or more parties. This authentication—depicted in block 440 and block 445—may be performed before, during and/or after one of: establishing a connection, transmission of one or more modules, reception of one or more modules, and/or other communication-related events.

At block 435, RSS unit 405 may receive the one or more applications (including wrapped and/or unwrapped applications).

At block 450, one or more RSS units 405 may modify one or more applications (including wrapped and/or unwrapped applications) that have been received. In some embodiments, these one or more applications may have been transmitted and/or received via one or more different receiving events/transmissions. This modification may include using a modification module to modify one or more applications in accordance with this disclosure.

In exemplary methods 400, this modification may include re-signing one or more applications already signed by RSS unit 405 and/or by another component and/or element. Thus, in this scenario methods 400 describe the re-signing of one or more already-wrapped applications—not merely just initially signing the one or more wrapped applications. In other embodiments, modifying the one or more applications at block 450 may include signing one or more applications that have not previously been signed.

In some embodiments, the applications may have been modified by RSS unit 405 and/or a related entity. In some embodiments, the applications may have been certified by RSS unit 405 and/or a related entity. In some embodiments, the applications may have been signed by RSS unit 405 and/or a related entity.

In some embodiments, RSS unit 405 may include one or more pieces of confidential information with at least one of the one or more applications. This confidential information may include a signature key, an identification key, and/or other confidential information—that may only be known by, only possessed by, and/or stored related to RSS unit 405 and/or a related entity—the key holding entity. This information may have at one time been known by a separate entity that may have issued the keys, but is not considered as knowing, possessing, and/or otherwise having the information here. This confidential information may not be known or discoverable by SaaS unit 410 and/or other units, or may only be partially known and/or discoverable by the SaaS unit and/or units other than RSS unit 405—including, for example, having a public part that may be known and/or discoverable.

At block 455, RSS unit 405 may transmit one or more applications to SaaS unit 410. In some embodiments, these applications may be wrapped, re-wrapped, unwrapped, and/or have other actions performed. The transmission of the one or more applications may be performed via a communication connection 150, which may be a wired and/or wireless link. This communication connection 150 may include using a network. In addition, the communication connection 150 may be a secure communication link require authentication by RSS unit 405, SaaS unit 410, by one or more other units involved in the transmission, and/or some combination. The authentication may require using one or more authentication keys, which in turn may include one or more public keys and/or one or more private keys, as discussed in this disclosure.

At block 460, SaaS unit 410 may receive the one or more applications—that may or may not include modified and/or wrapped applications—via a communication connection 150.

It should be noted that only some variations of the exemplary systems, such as systems 100-300, are explicitly shown and/or described and that a person of ordinary skill in the art having a basic understanding of certain concepts will be able to implement the ideas disclosed here to perform application transmissions, wrapping, receptions, authentication, encryption, modifications, and/or other related functions disclosed. In some embodiments, some, most, all, and/or any other combination of the elements and/or components shown in FIGS. 1-3 may be related, connected, and/or in communication with each other. In some embodiments, some, most, all, and/or any other combination of the elements and/or components shown in FIGS. 1-3 may be omitted, combined, added to, and/or other related actions.

In some embodiments, any and/or all of these operations may be performed by, or at, one or more of: a RSS unit, a SaaS unit, a first computing unit, a second computing unit, a network, a database, and/or other components, elements, and/or modules.

Figure 5:
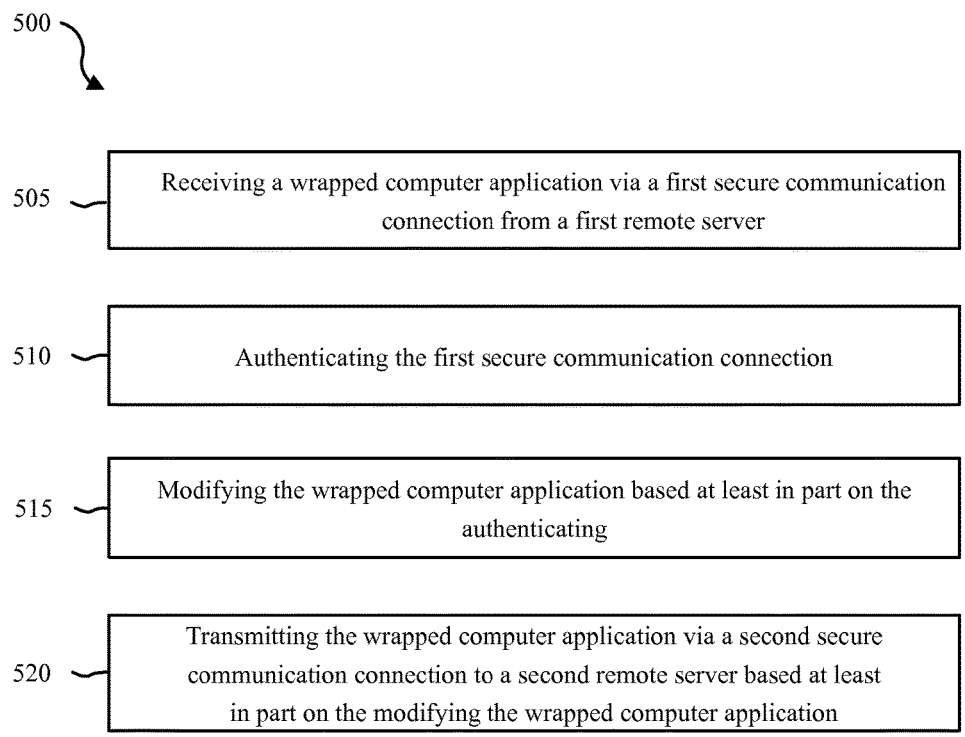
FIG. 5 is a block diagram illustrating embodiments of methods relating to wrapped computer applications.

FIG. 5 shows exemplary methods 500 and systems in accordance with some embodiments. In some embodiments, methods incorporating the present systems and methods may include receiving a wrapped computer application via a first secure communication connection from a first remote server, authenticating the first secure communication connection, modifying the wrapped computer application based at least in part on the authenticating, and/or transmitting the wrapped computer application via a second secure communication connection to a second remote server based at least in part on the modifying—as shown in blocks 505, 510, 515, and 520. In some embodiments, any and/or all of these operations may be performed by, or at, one or more of: a RSS unit, a SaaS unit, a first computing unit, a second computing unit, a network, a database, and/or other components, elements, and/or modules.

In some embodiments, modifying an application may include modifying, adding, amending, changing, certifying, and/or signing one or more elements of an application—including but not limited to a certificate. In some embodiments, the one or more secure connections (e.g., first connection, second connection, third connection, etc.) established between different units may include separate secure connections (distinct from each other) and/or may be based on one secure connection that may be used for multiple transmissions.

For example, a second secure communication connection and a first secure communication connection may be the same. As another example, a second secure communication connection and a first secure communication connection may be different, discreet connections—that may or may not exist and facilitate communication during a same time interval. In some embodiments, the different, discreet connections may exist in parallel, in series, in different relationships, and/or some combination.

In some embodiments, a unit related to the methods and the systems discussed in this disclosure, may communicate with one or more other units. For example, one or more RSS units may communicate with one or more SaaS units. These one or more RSS and/or SaaS units may include one or more remote servers (e.g., a first remote server, a second remote server, etc.) and/or one or more computing units. In some embodiments, a RSS unit may communicate with a first remote server and a second remote server—where the first and second remote servers are the same server and/or different servers, and are related to a SaaS unit.

Figure 6:
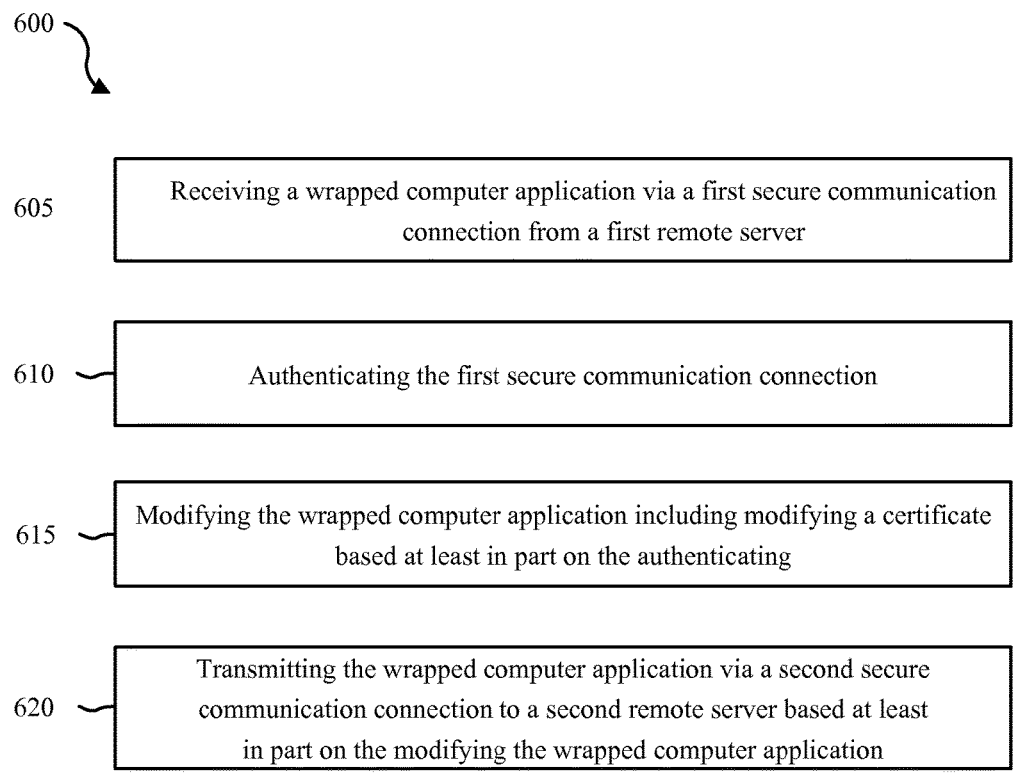
FIG. 6 is a block diagram illustrating embodiments of methods relating wrapped computer applications.

FIG. 6 shows exemplary methods 600 and systems in accordance with some embodiments. In some embodiments, methods incorporating the present systems and methods may include receiving a wrapped computer application via a first secure communication connection from a first remote server, authenticating the first secure communication connection, modifying the wrapped computer application including modifying a certificate based at least in part on the authenticating, and/or transmitting the wrapped computer application via a second secure communication connection to a second remote server based at least in part on the modifying the wrapped computer application—as shown in blocks 605, 610, 615, and 620. In some embodiments, any and/or all of these operations may be performed by, or at, one or more of: a RSS unit, a SaaS unit, a first computing unit, a second computing unit, a network, a database, and/or other components, elements, and/or modules.

Figure 7:
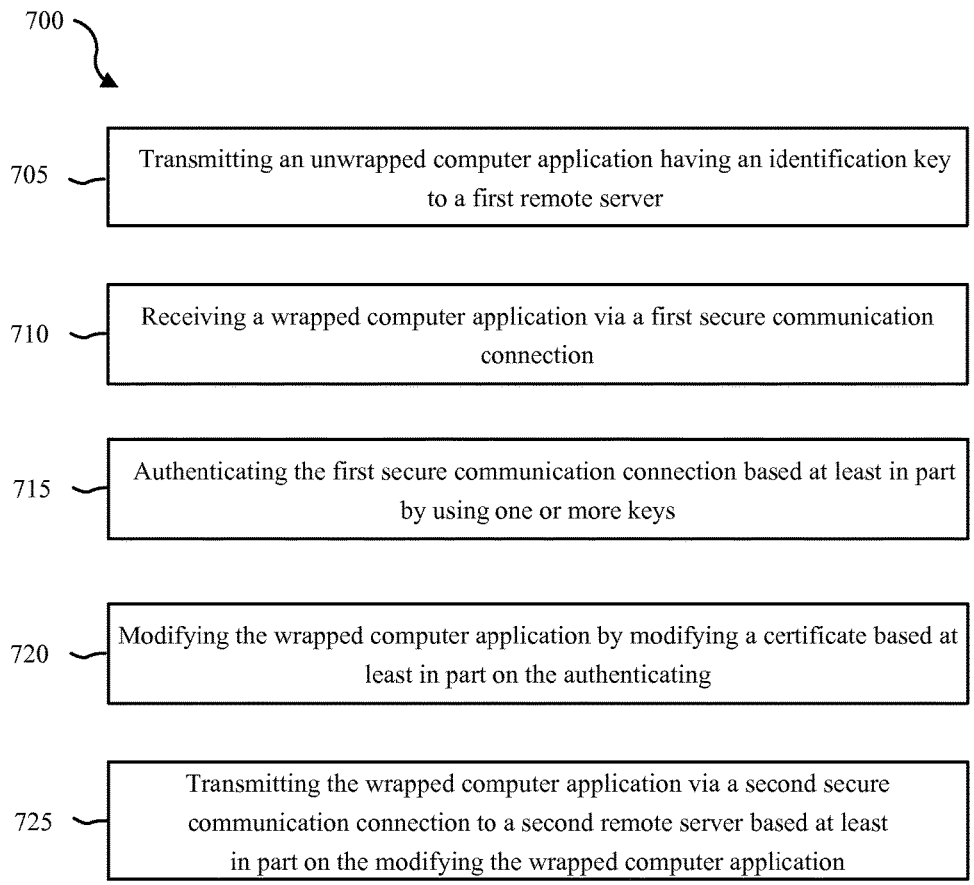
FIG. 7 is a block diagram illustrating embodiments of methods relating wrapped computer applications.

FIG. 7 shows exemplary methods 700 and systems in accordance with some embodiments. In some embodiments, methods incorporating the present systems and methods may include transmitting an unwrapped computer application having an identification key to a first remote server, receiving a wrapped computer application via a first secure communication connection, authenticating the first secure communication connection based at least in part by using one or more keys, modifying the wrapped computer application by modifying a certificate based at least in part on the authenticating, and/or transmitting the wrapped computer application via a second secure communication connection to a second remote server based at least in part on the modifying the wrapped computer application—as shown in blocks 705, 710, 715, 720, and 725. In some embodiments, any and/or all of these operations may be performed by, or at, one or more of: a RSS unit, a SaaS unit, a first computing unit, a second computing unit, a network, a database, and/or other components, elements, and/or modules.

In some embodiments, one or more identification keys may be included as part of one or more computer applications, which may be wrapped and/or unwrapped. The identification key may include similar and/or different properties to other confidential information and/or a signature key. The identification key may be known and/or stored only by a RSS unit and/or related entity. This identification key may not be known or discoverable by others—including the SaaS unit and/or related entity. This identification key may include a unique identifier of the RSS unit and/or related entity. In some embodiments, modifying an application may include modifying one or more parts of an application—including a certificate.

In some embodiments, a signature key (which may be used in some cases with an already-wrapped application) may be the same, similar, related to, and/or different from the identification key (which may be used in some cases with an unwrapped application).

Figure 8:
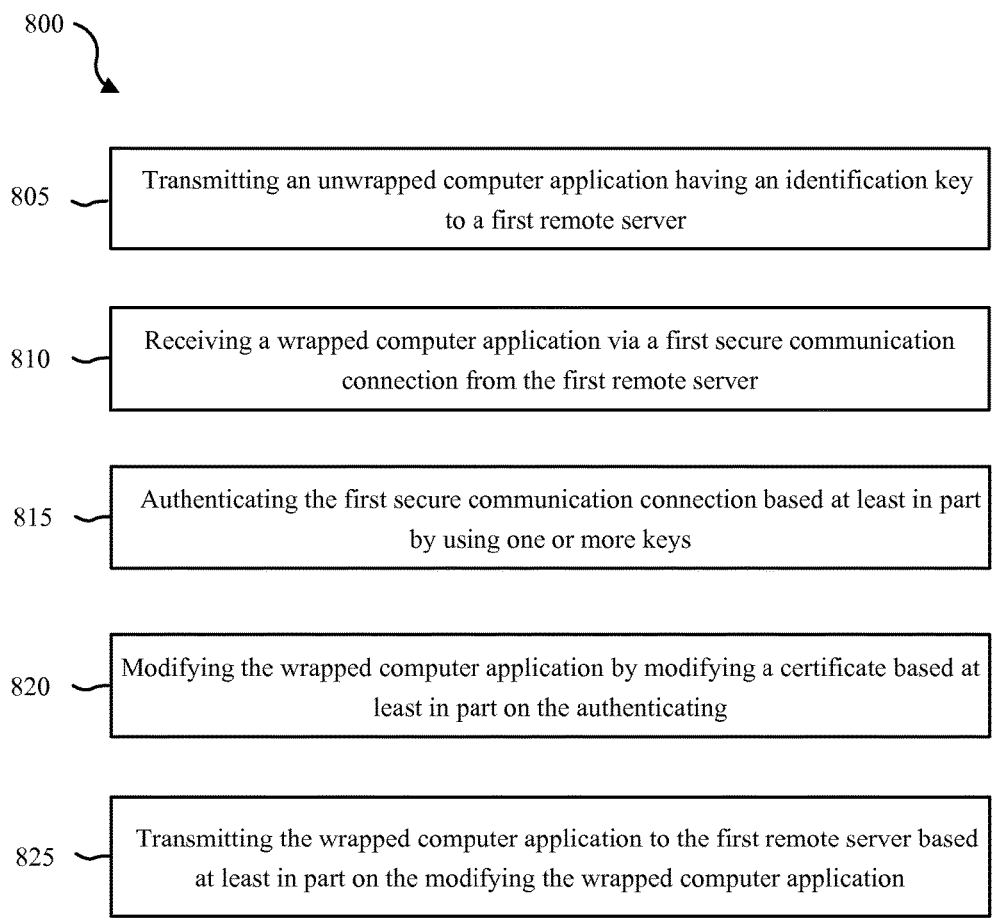
FIG. 8 is a block diagram illustrating embodiments of methods relating wrapped computer applications.

FIG. 8 shows exemplary methods 800 and systems in accordance with some embodiments. In some embodiments, methods incorporating the present systems and methods may include transmitting an unwrapped computer application having an identification key to a first remote server, receiving a wrapped computer application via a first secure communication connection from the first remote server, authenticating the first secure communication connection based at least in part by using one or more keys, modifying the wrapped computer application by modifying a certificate based at least in part on the authenticating, and/or transmitting the wrapped computer application to the first remote server based at least in part on the modifying the wrapped computer application—as shown in blocks 805, 810, 815, 820, and 825. In some embodiments, any and/or all of these operations may be performed by, or at, one or more of: a RSS unit, a SaaS unit, a first computing unit, a second computing unit, a network, a database, and/or other components, elements, and/or modules.

Figure 9:
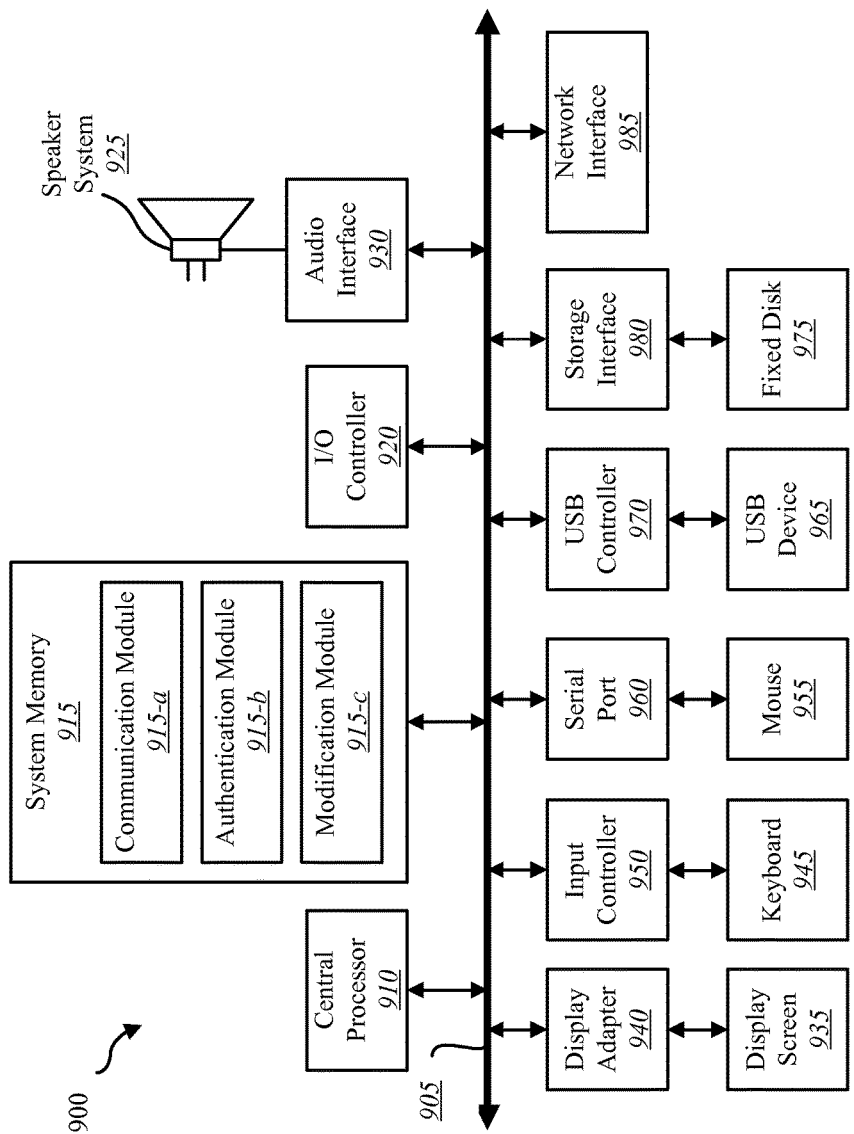
FIG. 9 depicts a block diagram of embodiments of a system suitable for implementing embodiments of the present systems and methods.

FIG. 9 depicts a block diagram of a controller 900 suitable for implementing the present systems and methods. The controller 900 may be an example of a RSS unit, a SaaS unit, a computing unit, and/or other units. In some embodiments, controller 900 includes a bus 905 which interconnects components and/or elements of controller 900 including one or more of: a central processor 910, a system memory 915 (which may include random access memory (RAM), read-only memory (ROM), flash RAM, and/or similar memory), an input/output controller 920, an external audio device, such as a speaker system 925 via an audio output interface 930, an external device, such as a display screen 935 via display adapter 940, an input device 945 (e.g., remote control device interfaced with an input controller 950), a USB device 965 (in some cases interfaced with a USB controller 970), and a storage interface 980. Also included are at least one sensor 955 connected to bus 905 through a sensor controller 960 and a network interface 985 (in some cases coupled directly to bus 905).

Bus 905 allows data communication between central processor 910, system memory 915 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different modules (e.g., communication, authentication, modification, wrapping, feedback, and/or others) to implement the present systems and methods may be stored within the system memory 915. Applications resident with controller 900 are generally stored on and accessed via a non-transitory computer readable medium, such as a hard disk drive (e.g., fixed disk 975) and/or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information—such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to controller 900 wirelessly via network interface 985.

Many other devices or subsystems may be connected in a similar manner (e.g., computing device, remote devices, transmitters, etc.). In addition, all of the devices shown in FIG. 9 need not be present to practice the disclosed systems and methods. The devices and subsystems can be interconnected in different ways from that shown in FIG. 9. Some aspects of some operations of a system, such as that shown in FIG. 9, may be readily known in the art and are not discussed in detail in this application.

Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, and/or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

While this disclosure sets forth various embodiments using specific block diagrams, flowcharts, and examples, each block diagram component, flowchart step, operation, and/or components described and/or illustrated here may be implemented—individually and/or collectively—using a wide range of hardware, software, and/or firmware (or any combination thereof) configurations. In addition, any disclosure of components contained within other components should be considered exemplary in nature since many other architectures can be implemented to achieve the same functionality, including combining multiple elements in one or more unitary and/or separate structures.

The process parameters and sequence of steps described and/or illustrated here are given by way of example only and can be varied as desired. For example, while the steps illustrated and/or described herein may be shown or discussed in a particular order, these steps do not necessarily need to be performed in the order illustrated or discussed. The various exemplary methods described and/or illustrated here may also omit one or more of the steps described and/or illustrated, and/or may include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

This description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for signing a wrapped computer application, comprising:
  receiving a wrapped computer application via a first secure communication connection from a first remote server;
  authenticating the first secure communication connection;
  modifying the wrapped computer application based at least in part on the authenticating, the modifying comprising modifying a certificate received from the first remote server, wherein the certificate comprises confidential information known by an entity modifying the wrapped computer application; and
  transmitting the wrapped computer application via the first secure communication connection to the first remote server based at least in part on modifying the certificate.

2. The method of claim 1, wherein authenticating the first secure communication connection comprises:
authenticating based at least in part by using one or more keys.

3. The method of claim 2, wherein the one or more keys comprise:
at least one of a public key and a private key.

4. The method of claim 1, wherein transmitting the wrapped computer application further comprises:
transmitting by way of a second secure communication connection, wherein the second secure communication is different from the first secure communication connection.

5. The method of claim 4, further comprising:
authenticating the second secure communication connection,
wherein the transmitting is based at least in part on the authenticating the second secure communication connection.

6. The method of claim 1, further comprising:
transmitting an unwrapped computer application having an identification key via a third secure communication connection.

7. The method of claim 6, wherein modifying the wrapped computer application comprises:
modifying the certificate using a signature key, and
wherein the identification key is the same as the signature key.

8. The method of claim 1, wherein transmitting the wrapped computer application further comprises:
transmitting to a second remote server, the second remote server different from the first remote server.

9. The method of claim 1, wherein the wrapped computer application is received based at least in part on one or more requests sent to the first remote server.

10. The method of claim 1, wherein the wrapped computer application is received based at least in part on one or more notifications sent by the first remote server.

11. A computing device for signing a wrapped computer application, comprising:
a processor;
memory in electronic communication with the processor, wherein the memory stores computer executable instructions that when executed by the processor cause the processor to perform the steps of:
receiving a wrapped computer application via a first secure communication connection from a first remote server;
authenticating the first secure communication connection;
modifying the wrapped computer application based at least in part on the authenticating, the modifying comprising modifying a certificate received from the first remote server, wherein the certificate comprises confidential information known by an entity modifying the wrapped computer application; and
transmitting the wrapped computer application via the first secure communication connection to the first remote server based at least in part on modifying the certificate.

12. The computing device of claim 11, wherein the instructions executed by the processor cause the processor to perform the step of:
transmitting an unwrapped computer application having an identification key via a third secure communication connection.

13. The computing device of claim 11, wherein the wrapped computer application is received based at least in part on one or more requests sent to the first remote server.

14. The computing device of claim 11, wherein the instructions executed by the processor cause the processor to perform the step of:
authenticating a second secure communication connection,
wherein the transmitting is based at least in part on the authenticating the second secure communication connection.

15. The computing device of claim 11, wherein modifying the wrapped computer application comprises:
using a signature key.

16. A non-transitory computer-readable storage medium storing computer executable instructions that when executed by a processor cause the processor to perform the steps of:
receiving a wrapped computer application via a first secure communication connection from a first remote server;
authenticating the first secure communication connection;
modifying the wrapped computer application based at least in part on the authenticating, the modifying comprising modifying a certificate received from the first remote server, wherein the certificate comprises confidential information known by an entity modifying the wrapped computer application; and
transmitting the wrapped computer application via the first secure communication connection to the first remote server based at least in part on modifying the certificate.

* * * * *